US008320972B2

(12) United States Patent
Ryu et al.

(10) Patent No.: US 8,320,972 B2
(45) Date of Patent: *Nov. 27, 2012

(54) MOBILE COMMUNICATION TERMINAL AND METHOD OF CONNECTING CALL THEREOF

(75) Inventors: Ho Sung Ryu, Seoul (KR); Kyung Ik Lee, Goyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/196,821

(22) Filed: Aug. 2, 2011

(65) Prior Publication Data

US 2011/0287813 A1  Nov. 24, 2011

Related U.S. Application Data

(63) Continuation of application No. 11/873,958, filed on Oct. 17, 2007, now Pat. No. 8,032,186.

(30) Foreign Application Priority Data

Oct. 17, 2006  (KR) .................. 10-2006-0101085
Nov. 22, 2006  (KR) .................. 10-2006-0116077

(51) Int. Cl.
*H04B 1/38*  (2006.01)
*H04K 3/00*  (2006.01)

(52) U.S. Cl. ....................... 455/566; 455/564

(58) Field of Classification Search .......... 455/564, 455/566–567, 575.3, 575.4
See application file for complete search history.

(56) References Cited

U.S. PATENT DOCUMENTS

| 6,185,295 | B1 | 2/2001 | Frederiksen et al. |
| 8,032,186 | B2 * | 10/2011 | Ryu et al. ............... 455/566 |
| 2001/0029173 | A1 | 10/2001 | Ogino |
| 2002/0142794 | A1 | 10/2002 | Harano |
| 2003/0040338 | A1 | 2/2003 | Saito |
| 2005/0124396 | A1 | 6/2005 | Brems et al. |

FOREIGN PATENT DOCUMENTS

| JP | 2004-72713 A | 3/2004 |
| KR | 10-2001-0026764 A | 4/2001 |
| KR | 10-2005-0013176 A | 2/2005 |
| KR | 10-2006-0043703 A | 5/2006 |

* cited by examiner

*Primary Examiner* — Lee Nguyen
(74) *Attorney, Agent, or Firm* — Birch, Stewart, Kolasch & Birch, LLP

(57) ABSTRACT

A mobile communication terminal including a wireless communication unit configured to receive a call; a touch screen display configured to display indication information that the call is being received and to display a first soft touch item and a second soft touch item on the touch screen display when the call is being received; and a control unit configured to connect the call being received if the first soft touch item is selected, and to control the touch screen display to continue to display the indication information indicating that the call is being received if the second soft touch item is selected.

22 Claims, 12 Drawing Sheets

MOBILE COMMUNICATION TERMINAL AND METHOD OF CONNECTING CALL THEREOF

CROSS REFERENCE TO RELATED APPLICATIONS

This application is a Continuation of application Ser. No. 11/873,958 filed on Oct. 17, 2007 now U.S. Pat. No. 8,032,186, which claims priority to Application No. 10-2006-0101085 filed in the Republic of Korea, on Oct. 17, 2006 and Application No. 10-2006-0116077 filed in the Republic of Korea, on Nov. 22, 2006. The entire contents of all of the above applications is hereby incorporated by reference.

BACKGROUND OF THE INVENTION

1. Field of the Invention

The present invention relates to a mobile communication terminal, and more particularly, to a mobile communication terminal and method of connecting a call thereof.

2. Discussion of the Related Art

Generally, in order to connect a received call, if a send key of a mobile communication terminal in an open status is pressed or if a closed status of the mobile communication terminal is changed into an open status, the mobile communication terminal connects the received call.

In particular, it is inconvenient that the mobile communication terminal should be open to connect the received call.

In order to transmit a call to an external terminal, the mobile communication terminal in the open status receives a phone number of the external terminal and then transmits a call to the external terminal.

In particular, it is inconvenient that the mobile communication terminal should be open to transmit the call.

And, the mobile communication terminal is essentially equipped with an antenna for transmitting and/or receiving radio signals, and a speaker and microphone enabling communication.

Normally, the microphone is provided to a lower part of the mobile communication terminal to be located in the vicinity of a user's mouth in the course of the communication. And, according to a downsizing tendency of a terminal, the antenna is provided within the mobile communication terminal, and more particularly, the lower part of the mobile communication terminal.

However, if the antenna is provided within the lower part of the mobile communication terminal, it is difficult to secure a space for arranging the antenna and the microphone.

SUMMARY OF THE INVENTION

Accordingly, the present invention is directed to a mobile communication terminal and method of connecting a call thereof that substantially obviate one or more problems due to limitations and disadvantages of the related art.

An object of the present invention is to provide a mobile communication terminal and method of connecting a call thereof, by which a received call can be connected even if the mobile communication terminal is in a closed status.

Another object of the present invention is to provide a mobile communication terminal and method of connecting a call thereof, by which the call can be transmitted to an external terminal despite that the mobile communication terminal is in a closed status.

Another object of the present invention is to provide a mobile communication terminal and method of connecting a call thereof, by which a received message can be checked or a message can be transmitted to an external terminal despite that the mobile communication terminal is in a closed status.

Another object of the present invention is to provide a mobile communication terminal and method of connecting a call thereof, by which a user can be provided with or select a user specific information despite that the mobile communication terminal is in a closed status.

A further object of the present invention is to provide a mobile communication terminal and method of connecting a call thereof, by which an antenna module and a microphone are efficiently arranged to prevent performance degradation of the microphone and antenna module.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal, which includes an upper body and a lower body, according to the present invention includes a wireless communication unit configured to receive a call; a display unit configured to display that the call is received and output an image for selecting either 'send' or 'reserve', if the call is received by the wireless communication unit; an input unit having a key for selecting either the 'send' or the 'reserve'; and a control unit configured to connect the received call if the 'send' is selected, and control the display unit to output an image for displaying that the call is received if the 'reserve' is selected, when the upper body is closed against the lower body.

In another aspect of the present invention, a mobile communication terminal, which includes an upper body and a lower body, includes a display unit configured to output information; an input unit configured to generate a signal for executing a function; and a control unit configured to control the display unit to output at least one of a most recently called number and address book information according to a signal inputted from the input unit, when the upper body is closed against the lower body.

In another aspect of the present invention, a method of connecting a call in a mobile communication terminal, which is in a closed status, includes the steps of receiving a call; displaying that the call is received and outputting an image for selecting either 'send' or 'reserve' according to receiving the call; selecting either the 'send' or the 'reserve'; connecting the received call if the 'send' is selected; and outputting an image for displaying that the call is received if the 'reserve' is selected.

In another aspect of the present invention, a method of connecting a call in a mobile communication terminal includes the steps of entering a different call associated mode according to opening or closing the mobile communication terminal; and outputting an image for selecting 'send' according to the entered call associated mode while the mobile communication terminal is closed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A configuration of a mobile communication terminal according to one embodiment of the present invention is explained in detail with reference to FIG. 1 as follows.

Figure 1:
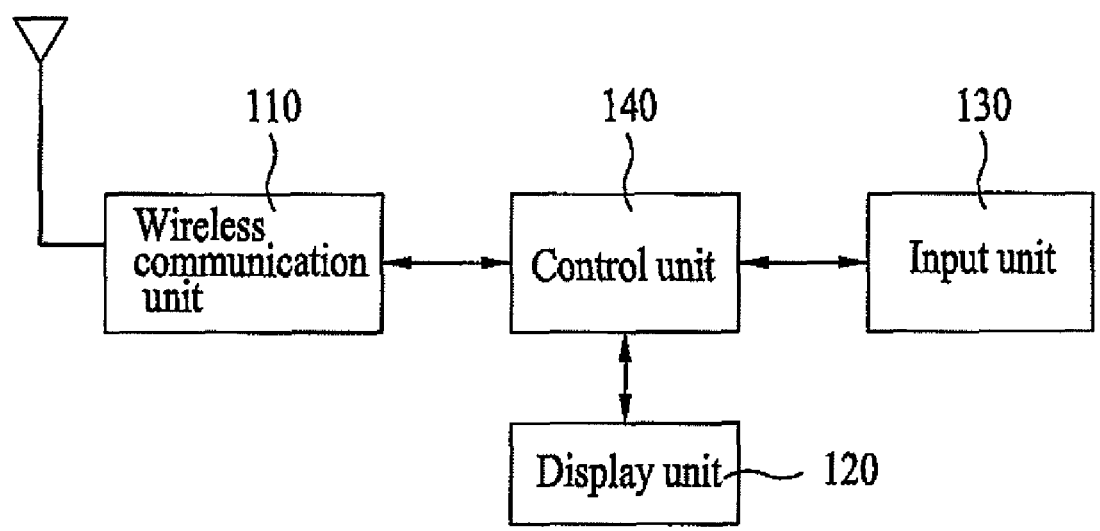
FIG. 1 is a block diagram of a mobile communication terminal according to one embodiment of the present invention.

FIG. 1 is a block diagram of a mobile communication terminal according to one embodiment of the present invention.

Referring to FIG. 1, a mobile communication terminal according to one embodiment of the present invention includes a wireless communication unit 110, a display unit 120, an input unit 130, and a control unit 140.

The wireless communication unit 110 tranceives wireless signals with an external terminal via a wireless communication network.

The display unit 120 displays various information associated terminal including status information for the terminal.

The input unit 130 receives an input action from a user and then generates a signal corresponding to the received input action.

And, the control unit 140 controls overall actions of the terminal.

The mobile communication terminal is characterized in including an upper body and a lower body.

For instance, the mobile communication terminal may correspond to a slide type terminal including an upper slider corresponding to the upper body and a lower slider corresponding to the lower body. For another instance, the mobile communication terminal may correspond to a folder type terminal including an upper folder corresponding to the upper body and a lower folder corresponding to the lower body.

And, a display means for outputting information is provided to the upper or lower body.

The display unit 120 and the input unit 130 may include a touchscreen detecting a touch to its prescribed portion to generate a corresponding signal.

A mobile communication terminal according to a first embodiment of the present invention is explained in detail as follows.

First of all, in case that a call is received by the wireless communication unit 110, the display unit 120 displays that the call is received and outputs an image for selecting either 'send' or 'reserve'. In this case, the all includes an audio call and a video call.

In case that a message is received by the wireless communication unit 110, the display unit 120 outputs an image for selecting either 'confirm' or 'reserve' as soon as displays that the message is received. In this case, the message includes a character message by SMS (short message service) and a multimedia message by MMS (multimedia messaging service).

In this case, the upper body may be in an open or closed status against the lower body.

The 'reserve' means a function of outputting an image indicating a call/message reception for the received call/message without outputting sound or vibration. So, despite that a mode for indicating the call or message reception is set to 'vibration' or 'sound', if the 'reserve' is selected, the mobile communication terminal operates as silence for the call or message reception.

The 'send' means a function of connecting the received call. So, if the 'send' is selected, the mobile communication terminal connects the received call.

The 'confirm' means a function of confirming the received message. If the 'confirm' is selected, the mobile communication terminal outputs contents of the received message on the screen.

Figure 8:
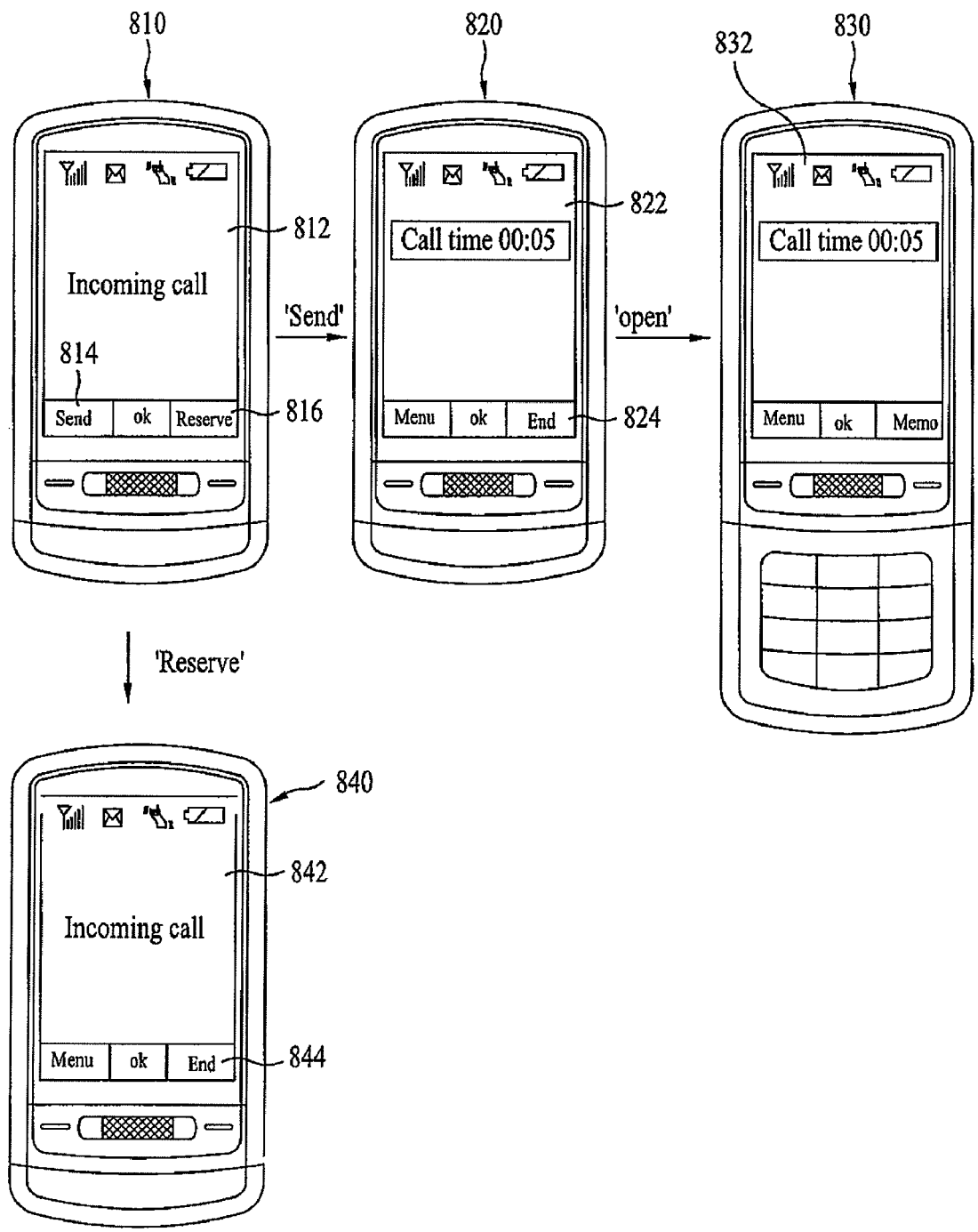
FIG. 8 is a diagram to explain a process for connecting a call received by a mobile communication terminal in a closed status according to the present invention.

For instance, if a call is received, the display unit 120 displays the 'send' 814 and the 'reserve' 816, as indicated by '810' in FIG. 8, on a lower area of the image 812. If a message is received, the display unit 120, as indicated by '910' in FIG. 9, displays the 'confirm' 914 and the 'reserve' 916 on a lower area of the image 912.

The input unit 130 includes at least one of a plurality of keys to which the 'send', the 'reserve', the 'confirm', and the 'end' are assigned, respectively. In this case, the keys are soft keys. And, at least one of the 'send', the 'reserve', the 'confirm', and the 'end' can be assigned to the key.

In case that the input unit 130 includes a touchscreen, the input unit 130 detects a touch to a display area of the 'send', the 'reserve', the 'confirm', or the 'end' and then generates a corresponding signal.

And, the input unit 130 can include a scroll key for scrolling a plurality of data displayed via the display unit 120.

For instance, the input unit 130 can be provided with keys, as indicated by '810' shown in FIG. 8, below the 'send' 814 and the 'reserve' 816 displayed on the image 812 to have 'send' and 'reserve' inputted thereto, respectively.

In this case, if the 'send' is selected, the control unit 140 controls the wireless communication unit 110 to connect the received call. If the 'reserve' is selected, the control unit 140 controls the display unit 120 to output an image indicating that the call is received.

If the 'send' or 'reserve' is selected, the control unit 140 controls the display unit 120 to display the 'end' for selecting a rejection of the received call. In this case, the input unit 130 includes a key, which is provided below the 'end', for having the corresponding selection inputted thereto.

Figure 9:
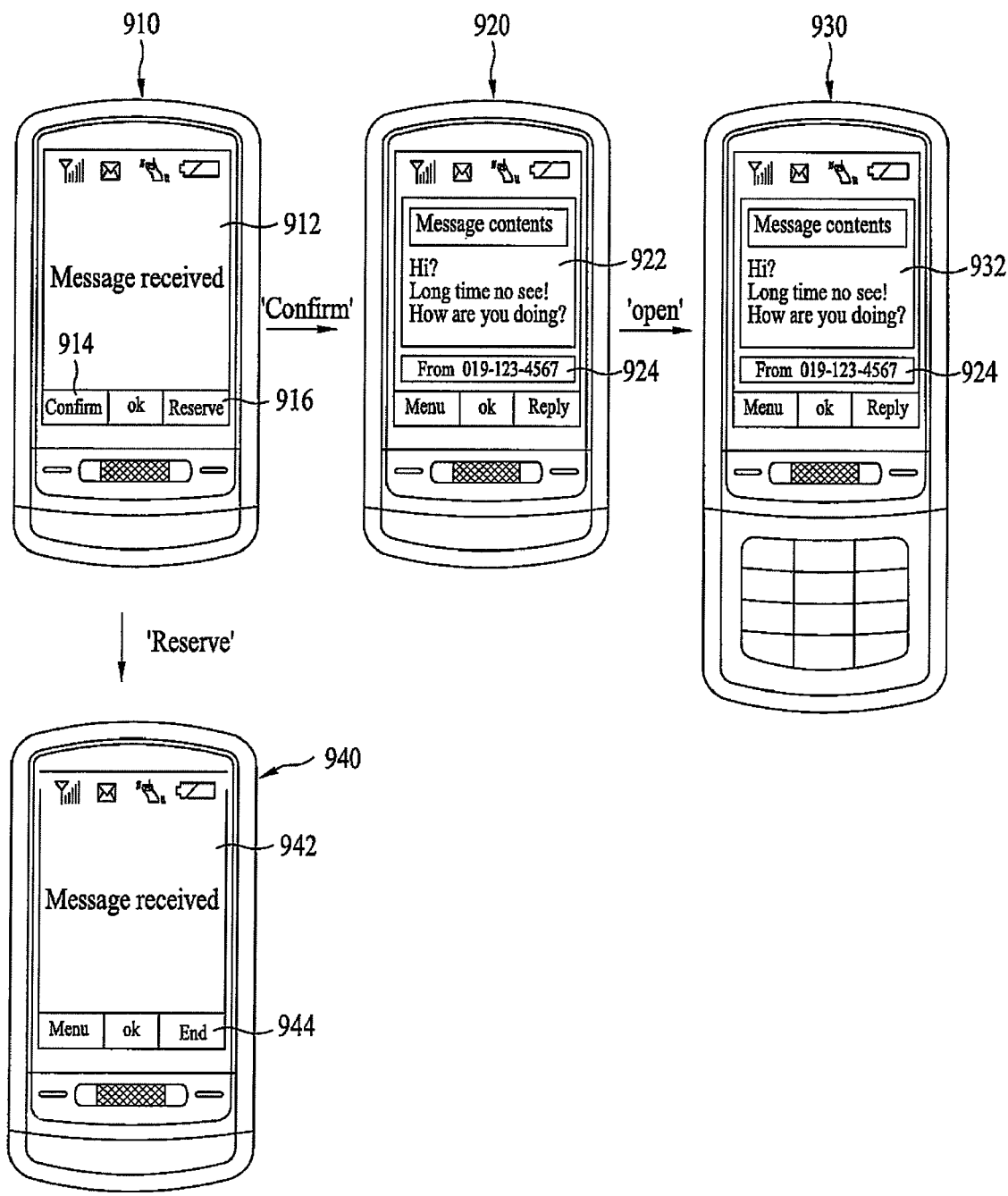
FIG. 9 is a diagram to explain a process for checking a message received by a mobile communication terminal in a closed status according to the present invention.

Alternatively, for instance, the input unit 130 can include keys, as indicated by '910' shown in FIG. 9, provided below the 'confirm' 914 and the 'reserve' 916 displayed on a image 912 to have them inputted thereto, respectively.

In this case, if the 'confirm' is selected, the control unit 140 controls the display unit 120 to output an image indicating contents of the received message. If the 'reserve' is selected, the control unit 140 controls the display unit 120 to output an image indicating that the message is received.

A mobile communication terminal according to a second embodiment of the present invention is explained in detail as follows.

Figure 10:
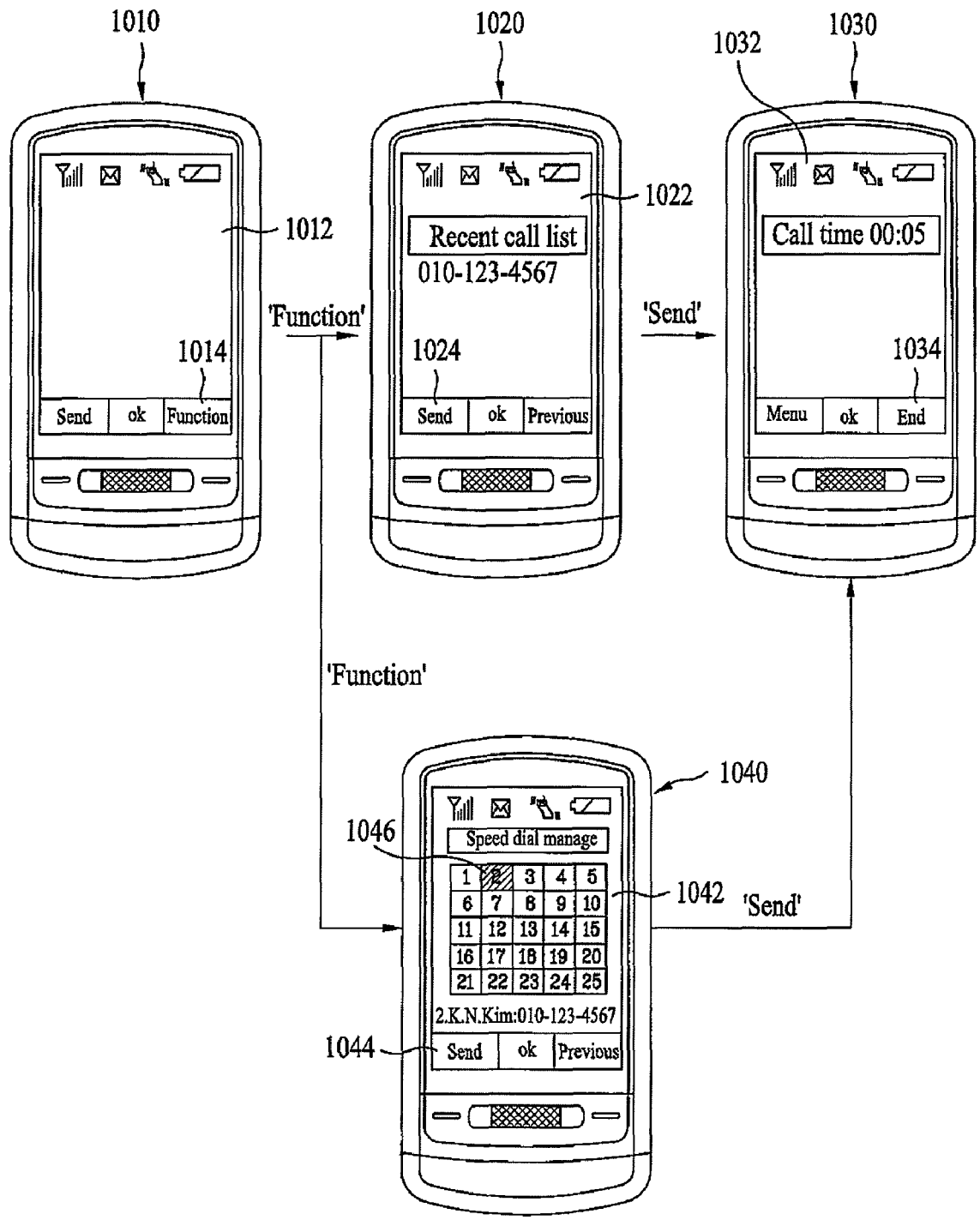
FIG. 10 is a diagram to explain a process for transmitting a call by a mobile communication terminal in a closed status according to the present invention.

First of all, while the upper body is closed against the lower body, the display unit 120 displays 'function' 1014/1114, which indicates that a specific function is selectable, as indicated by '1010'/'1110' shown in FIG. 10/11, in a lower area of an image 1012/1112. In this case, the specific function means a function of transmitting a call or message while a terminal is closed.

The input unit 130 includes a key provided below the 'function' 1014/1114 for having 'function' inputted thereto. So, if the key is selected by a user, the mobile communication terminal sets an operable status of the specific function.

For instance, in case that the display unit 102 and the input unit 130 include a touchscreen, as a display area of the 'function' 1014/1114 is touched, the mobile communication terminal can set the operable status of the specific function.

If the 'function' 1014/1114 is selected, the control unit 140 controls address book information, and more particularly, a speed dial list, as indicated by '1040'/'1140' shown in FIG. 10/11, to be displayed. In this case, the display unit 120 displays a phone number and user name set for a speed dial selected by a user from a plurality of speed dials configuring the speed dial list.

In doing so, the control unit 140 controls the 'send' 1044, as indicated by '1040' shown in FIG. 10, to be displayed in the lower area of the image 1042. If the 'send' 1044 is selected, the wireless communication unit 110 sends a call to the phone number to which the selected speed dial is set.

Figure 11:
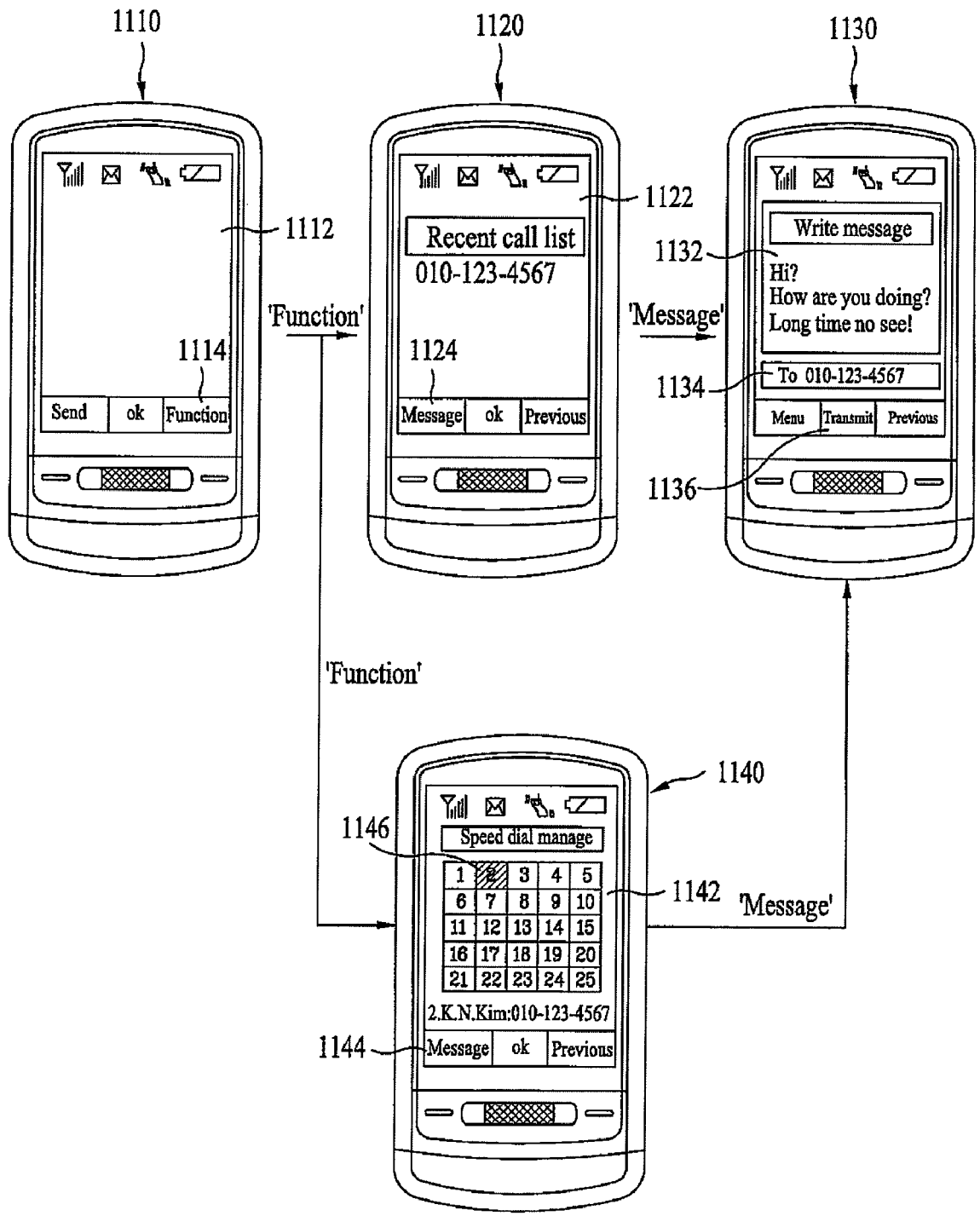
FIG. 11 is a diagram to explain a process for transmitting a message by a mobile communication terminal in a closed status according to the present invention.

The control unit 140 controls 'message' 1144, as indicated by '1140' shown in FIG. 11, to be displayed in a lower area of the image 1142. If the 'message' 1144 is selected, the control unit 140 enters a write mode of a message to be sent to the phone number to which the selected speed dial is set.

A mobile communication terminal according to a third embodiment of the present invention is explained in detail as follows.

First of all, a mobile communication terminal according to a third embodiment of the present invention enters a send associated mode differing according to an open/closed status of the mobile communication terminal and then outputs an image for selecting 'send'.

In case that the mobile communication terminal enters the open status that the upper body is open against the lower body, the display unit 120 outputs address book information stored in the mobile communication terminal. In this case, the address book information means a phone number list, a speed dial list, user names set to correspond to phone numbers, e-mail addresses, and the like.

As mentioned in the foregoing description, in case that the upper body is closed against the lower body, the display unit 120 is able to output a recent call list or address book information.

Various embodiments according to configurational features of the mobile communication terminal of the present invention are explained with reference to FIGS. 2 to 6 as follows.

Figure 2:
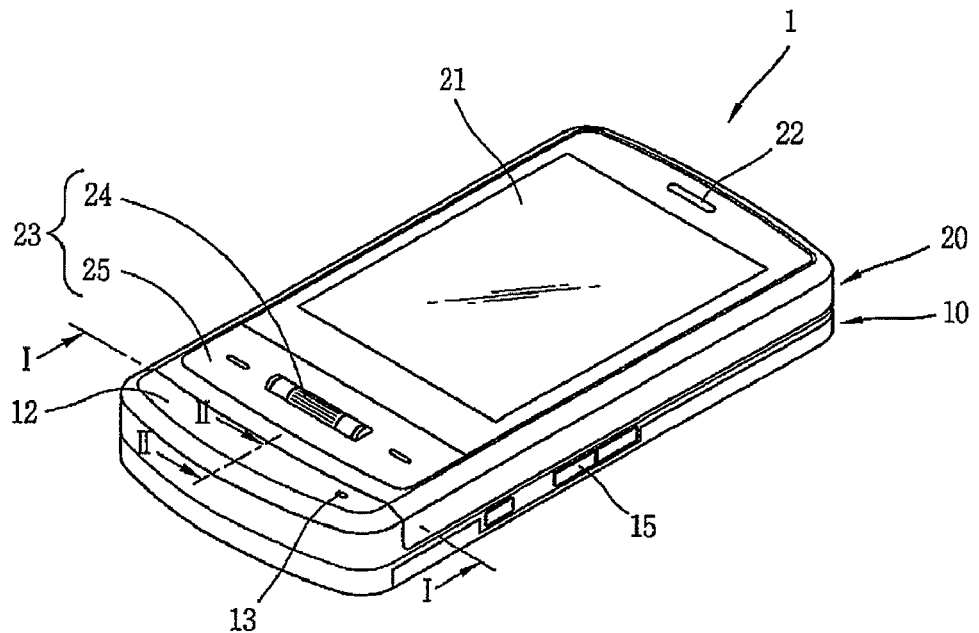
FIG. 2 is a perspective diagram of a mobile communication terminal according to one embodiment of the present invention.
Figure 3:
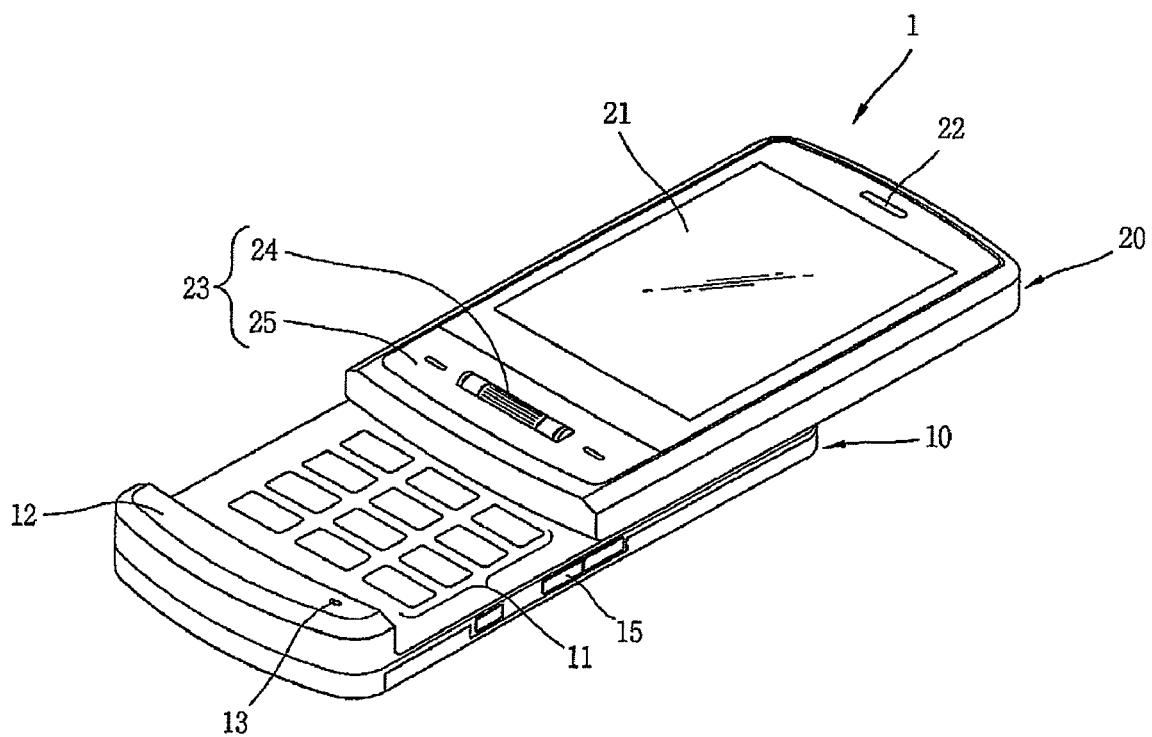
FIG. 3 is a perspective diagram of the mobile communication terminal shown in FIG. 2, which shows a status that an upper body of the mobile communication terminal is open against a lower body thereof.

FIG. 2 is a perspective diagram of a mobile communication terminal 1 according to one embodiment of the present invention. FIG. 3 is a perspective diagram of the mobile communication terminal 1 shown in FIG. 2, which shows a status that an upper body 20 of the mobile communication terminal is open against a lower body 10 thereof.

Referring to FIG. 2 and FIG. 3, the mobile communication terminal 1 includes the lower body 10 and the upper body 20 slidably provided to a front side of the lower body 10.

In particular, the upper body 20 slides up or down on the lower body 10 to open/close.

Besides, the present invention is applicable to a bar or folder type terminal (not shown in the drawings).

Referring to FIG. 2, the upper body 20 is configured shorter than the lower body 10. And, a lower end of the lower body 10 includes an exposed part 12 that is always exposed regardless of the opening/closing of the upper body 20.

A microphone hole 13 is formed at a front side of the exposed part 12 to make a microphone (cf. '50') communicate with an external environment. So, a user is able to have communication without opening the upper body 20 against the lower body 10.

The front side of the exposed part 12 is formed not to be lower than a front side of the upper body 20 at least. So, a space for arranging an antenna module (cf. '40') and the microphone 50 therein can be prepared. Moreover, by loading the microphone 50 in the exposed part 12, it is able to enhance closeness between user's mouth and the microphone 50.

The front side of the upper body 20 can be provided with a display 21 for outputting visual information, a speaker 22 provided above the display 21 to output audio information, and an external input device 23 provided below the display 21 to input a prescribed signal to the mobile communication terminal 1 regardless of the opening/closing of the upper body 20. Moreover, a button 15 for a separate input or control can be provided to a lateral side of the lower body 10.

Preferably, the external input device 23 includes a rotatable scroll key 24 to enable a fast data search. Preferably, a housing 25 covers a surrounding of the scroll key 24 to configure an exterior of the upper body 20 and enable a push input.

And, a keypad 11 is provided to a front side of the lower body 10 opened/closed by the upper body 20. In this case, the keypad 11 includes a plurality of keys for characters, numbers, and various controls.

Figure 4:
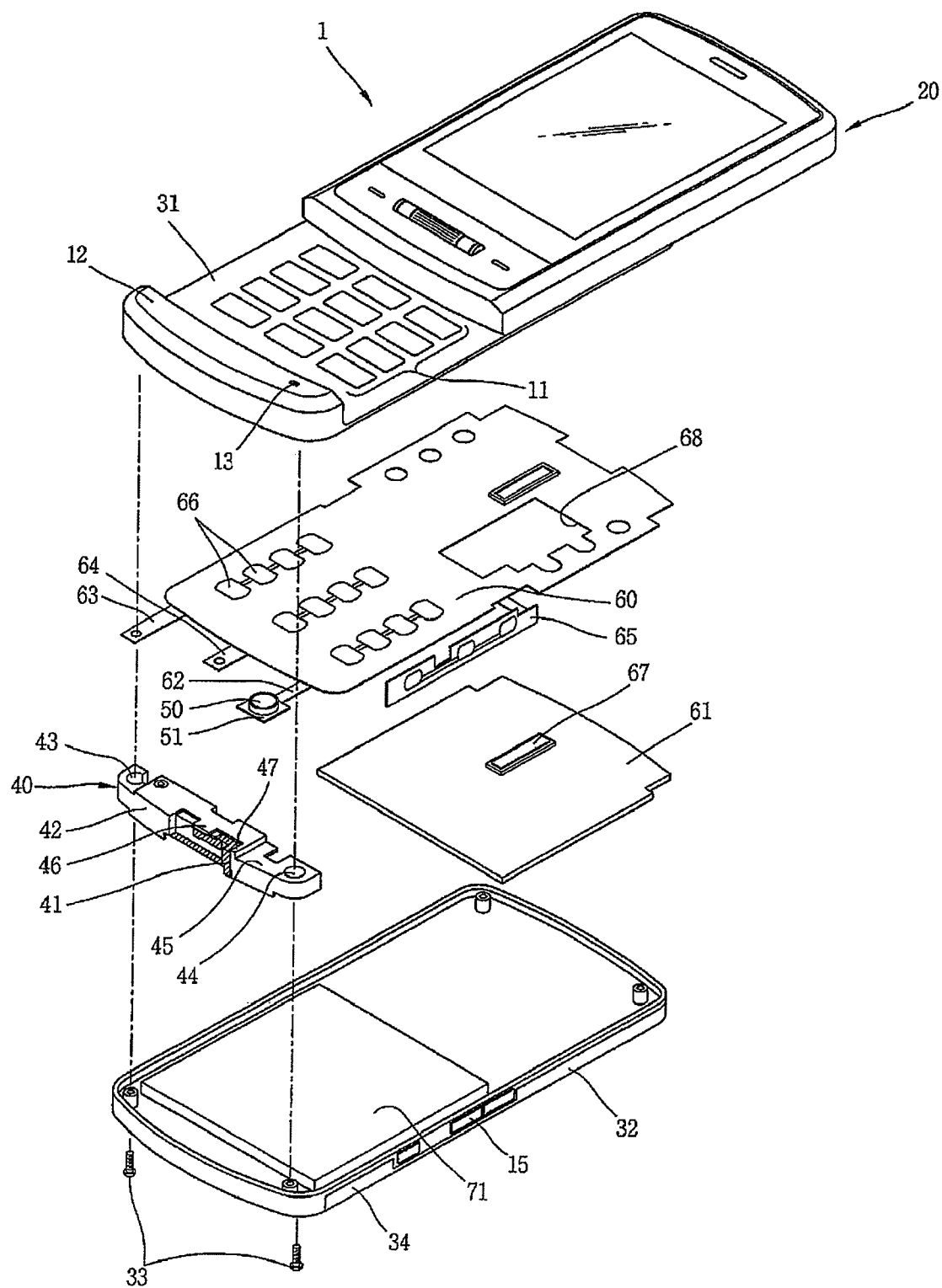
FIG. 4 is an exploded perspective diagram of the lower body of the mobile communication terminal shown in FIG. 3.

FIG. 4 is an exploded perspective diagram of the lower body 10 of the mobile communication terminal 1 shown in FIG. 3.

Referring to FIG. 4, the lower body 10 includes a front case 31 having the aforesaid exposed part 12 and a rear case 32 assembled to the front case 31 to configure an exterior of the mobile communication terminal 1.

Preferably, a metal based cover, which is detachable to load/unload a battery for supplying a power to the mobile communication terminal 1, is provided to an outer surface of the rear case 32. In particular, the cover is configured to cover a whole part of the outer surface of the rear case 32, thereby enhancing an exterior of the mobile communication terminal 1.

And, a first flexible printed circuit board 60 provided with a plurality of switches 66 operated by the keypad 11 and a main circuit board 61 placed under the first flexible printed circuit board 60 to be provided with a plurality of circuit parts for processing RF signals are provided between the front case 31 and the rear case 32.

In particular, the first flexible printed circuit board 60 is configured to have a thin shape and the main circuit board 61 has a size not overlapped with a battery accommodating part 71 of the rear case 32. As the main circuit board 61 and the first flexible printed circuit board 60 are aligned parallel with each other, the mobile communication terminal 1 can have a slim size.

A passing hole 68 is provided to an upper end portion of the first flexible printed circuit board 60 to enable a connecting cable, which connects the upper body 20 and a connector 67 provided to the main circuit board 61, or a flexible printed circuit board to pass through.

Figure 6:
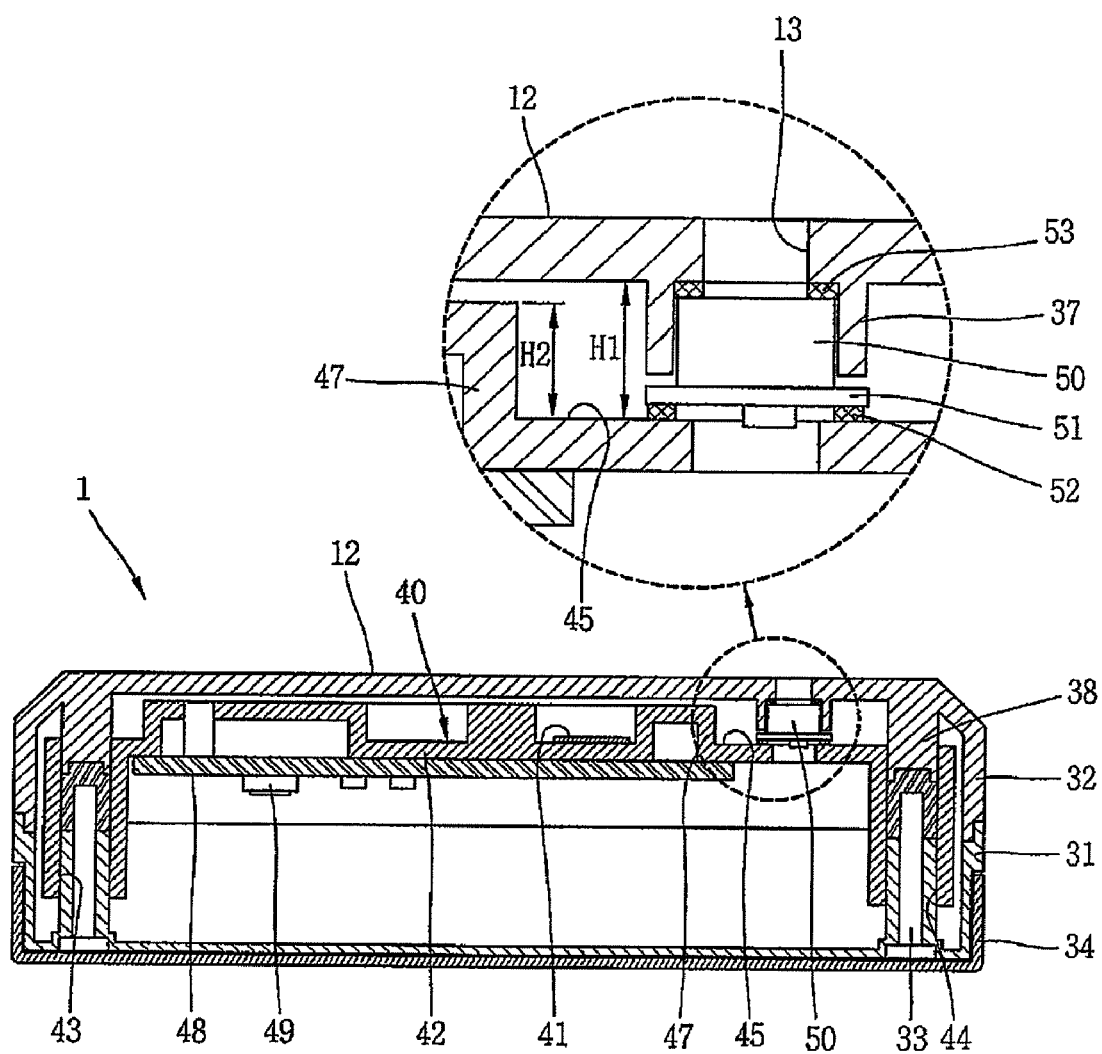
FIG. 6 is a cross-sectional diagram of the mobile communication terminal shown in FIG. 2 according to a cutting line II-II.

A microphone 50 is connected to a lower end portion of the first flexible printed circuit board 60. In this case, the microphone 50 is connected to the first flexible printed circuit board 60 via a second flexible printed circuit board 62 extending from one side of the lower end portion of the first flexible printed circuit board 60 to a predetermined length. The second flexible printed circuit board 62, as shown in FIG. 6, is transformed according to its bending feature to connect the microphone 50 and the first flexible printed circuit board 60 by overcoming a height difference between the microphone 50 and the first flexible printed circuit board 60.

And, the microphone 50 is provided to an antenna module 40 loaded in the exposed part 12 to communicate with an external environment via the microphone hole 13 provided to the exposed part 12.

The antenna module 40 includes a non-conductive carrier 42 having a microphone accommodating part 45 with a predetermined depth to accommodate the microphone 50 therein and a conductive radiator 41 fixed onto the carrier 42 to transceive radio waves.

The radiator 41 can form a predetermined pattern on the carrier 42 to secure a length suitable for a frequency band and obtain a good radiation characteristic.

The carrier 42 can be formed by injection molding of a resin based material to have a shape for fixing the radiator 41 thereto and accommodating the microphone 50 therein. And, insertion holes 43 and 44 are provided to both ends of the carrier 42 to enable locking projections 38 to be inserted therein for locking the front case 31 and the rear case 32 to each other using screws, respectively.

Figure 5:
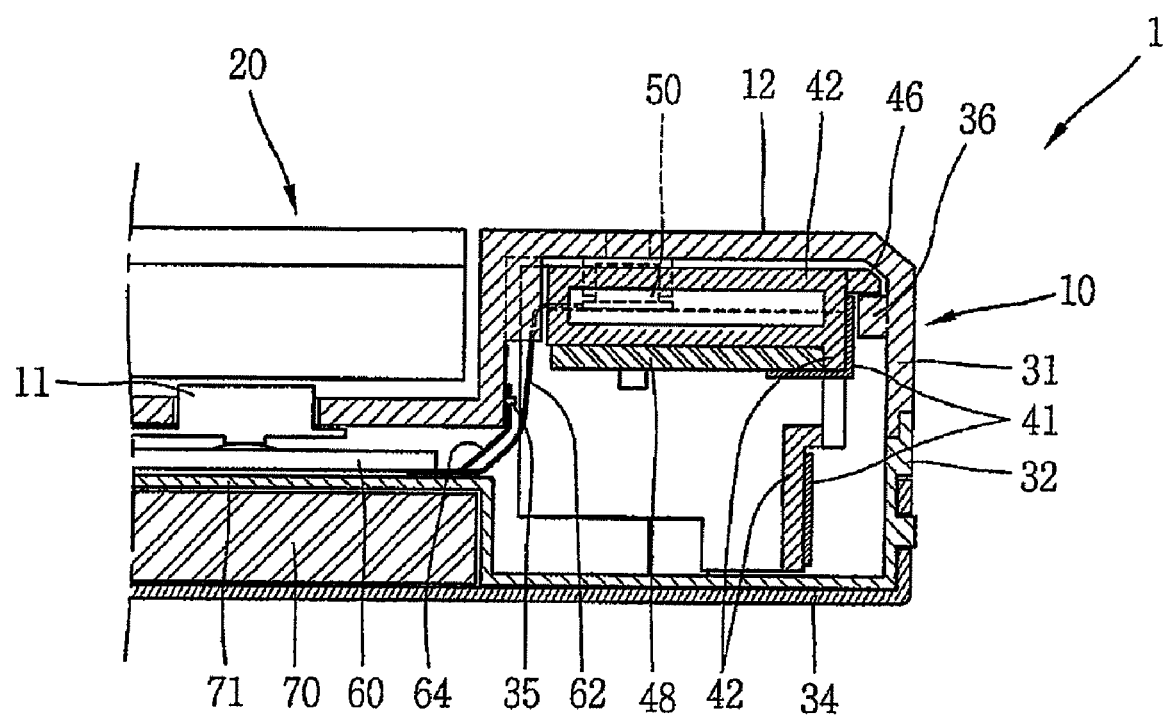
FIG. 5 is a cross-sectional diagram of the mobile communication terminal shown in FIG. 2 according to a cutting line I-I.

FIG. 5 is a cross-sectional diagram of the mobile communication terminal 1 shown in FIG. 2 according to a cutting line I-I, and FIG. 6 is a cross-sectional diagram of the mobile communication terminal 1 shown in FIG. 2 according to a cutting line II-II.

Referring to FIG. 5 and FIG. 6, the carrier 42 of the antenna module 40 is inserted in the locking projections 38 provided within the front case 31 to be assembled to the front case 31.

And, a hook 46 is provided to one side of the carrier 42 to sustain a temporary locking status by pressing inward the front case 31 and a holding projection 36 is provided to an inside of the front case 31 to hold the hook 46. So, by pressing the carrier 42 into the front case 31, the hook 46 is held by the holding carrier 36 to sustain the temporary locking status. The front case 31 and the rear case 32 are then locked to each other by the screws 33.

The microphone accommodating part 45, as shown in an enlarged diagram of FIG. 6, is configured to have a shape open in a front direction of the carrier 42. To enable the microphone 50 to be pressed in assembling the carrier 42 to the front case 31, a depth H2 of the microphone accommodating part 45 is configured not to be greater than a height H1 of the microphone 50.

A bottom side of the microphone 50 is fixed by the substrate 51 and a cushion member 52 is provided to a lower edge of the substrate 51 to elastically pressurize the microphone 50 against the front case 31 in assembling the carrier 42.

A mount rib 37 is provided around the microphone hole 13 of the front case 31 to hold a position of the microphone 50 in assembling the microphone 50. And, a sealing member 53 is provided to an inner circumference of the microphone hole 13 to prevent sound leakage after completion of the assembly of the microphone 50.

At least one wall 47 is provided to the carrier 42 to partition the radiator 41 from the microphone 50. So, the radio characteristics of the radiator 41 are prevented from being affected by the microphone 50. Preferably, the microphone 50 can be provided to incline toward one side of the lower body 10 and to be spaced apart from the radiator 41 with a prescribed distance.

A circuit board 48 having a matching circuit part matching impedance of the antenna module 40 can be provided to a middle part of the carrier 42. In this case, the circuit board 48 can be provided with a connector 49 for supplying a power to a coaxial cable (not shown in the drawings) to consider a distance between the antenna module 40 and the main circuit board 61.

Besides, the radiator 41, as shown in FIG. 4, can be connected by a third flexible printed circuit board 63 connected to a ground of to the main circuit board 61 and the first flexible printed circuit board 60 to use ground extension.

The microphone 50, as shown in FIG. 6, is provided within the exposed part 12 by the assembly of the carrier 42 and overcomes the height difference from the first flexible printed circuit board 60 by the transformation of the second flexible printed circuit board 62 connecting the microphone 50.

Meanwhile, an unexplained reference number '64' in FIG. 4 or FIG. 6 indicates a fourth flexible printed circuit board connecting a conductive layer within the front case 31 or the rear case 32 to the ground of the main circuit board 61 and the first flexible printed circuit board 60. An unexplained reference number '35' indicates a fixing projection for fixing a position of the fourth flexible printed circuit board. And, an unexplained reference number '65' indicates a fifth flexible printed circuit board in which a switch operated by the button 15 is loaded.

A method of connecting a call in a mobile communication terminal according to one embodiment of the present invention is explained in detail with reference to FIG. 7 as follows.

Figure 7:
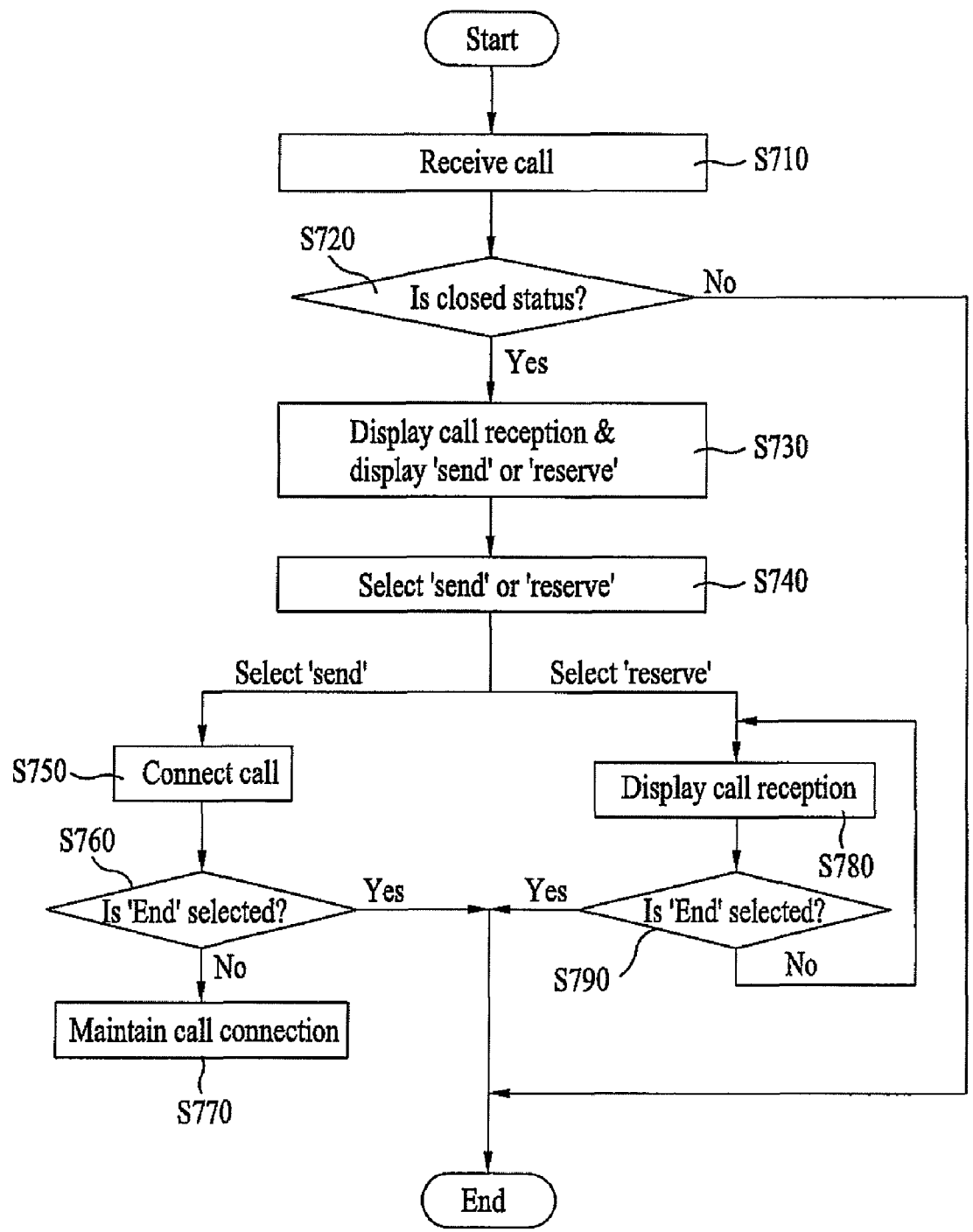
FIG. 7 is a flowchart of a method of connecting a call in a mobile communication terminal according to one embodiment of the present invention.

FIG. 7 is a flowchart of a method of connecting a call in a mobile communication terminal according to one embodiment of the present invention.

Referring to FIG. 7, the mobile communication terminal receives a call via a wireless communication network (S710).

Having received the call, the mobile communication terminal decides whether it is in a closed status (S720).

For instance, in case that the mobile communication terminal is a folder type terminal, the deciding step S720 decides that the mobile communication terminal is in the closed status if an upper folder is closed against a lower folder. In case that that the mobile communication terminal is a slide type terminal, the deciding step S720 decides that the mobile communication terminal is in the closed status if an upper slider is closed against a lower slider.

In case of deciding that it is in the closed status, the mobile communication terminal displays that the call is received as soon as outputs an image for selecting 'send' or 'reserve' {S730}.

For instance, in the outputting step (s730), the 'send' 814 and the 'reserve' 816 are displayed on the lower area of the image 812.

Either the 'send' or the 'reserve' is selected and inputted to the mobile communication terminal (S740).

In this case, the mobile communication terminal includes a key for selecting at least one of the 'send' and the 'reserve'.

If the 'send' is selected, the mobile communication terminal connects the received call (S750).

The mobile communication terminal then decides whether 'end' is selected (S760).

If it is decided that the 'end' is not selected, the mobile communication terminal maintains the connected call (S770). If it is decided that the 'end' is selected, the mobile communication terminal ends the connected call.

If the 'reserve' is selected, the mobile communication terminal displays that the call is received (S780).

In this case, in order to information a user that the call is received, the mobile communication terminal is able to output an image for announcing the call reception or may not provide vibration or sound for announcing the call reception.

The mobile communication terminal decides whether 'end' is selected (S790). If it is decided that the 'end' is not selected, the mobile communication terminal maintains the image output for announcing the call reception (S780). If it is decided that the 'end' is selected, the mobile communication terminal stops the image output for announcing the call reception and rejects a connection for the received call.

Meanwhile, if the mobile communication terminal enters an open status, it can output an image for selecting 'end'. If the 'end' is selected, the mobile communication terminal rejects the received call before completion of a call connection or terminates the connected call after completion of the call connection.

For convenience of explanation, the following description of the detailed embodiments of the present invention is restricted to a slide type terminal only. As mentioned in the foregoing description, it is yet to be understood that the embodiments of the present invention are applicable to a folder type terminal or a bar type terminal.

A process for connecting a call received by a mobile communication terminal in a closed status according to the present invention is explained in detail with reference to FIG. 8 as follows.

FIG. 8 is a diagram to explain a process for connecting a call received by a mobile communication terminal in a closed status according to the present invention.

Referring to FIG. 8, in case of receiving a call, the mobile communication terminal displays a phrase announcing that the call is received on an image 812 as soon as displays 'send' 814 and 'reserve' 816 on a lower end of the image 812 (810).

If the 'send' 814 is selected, the mobile communication terminal connects the received call. The mobile communication terminal displays a call time according to the call connection on an image 822 as soon as displays 'end' 824 on a lower end of the image 822 (820). In this case, if the 'end' 824 is selected, the mobile communication terminal terminates the connected call.

If the upper slider is open against the lower slider in the status 820, the mobile communication terminal displays a normal input window for a call connection on a lower end of the image 832 while maintaining the connected call (830).

If the 'reserve' 816 is selected, the mobile communication terminal displays a phrase announcing that a call is received on an image 842 as soon as displays 'end' 844 on a lower end of the image 842 (840). In this case, if the 'end' 844 is selected, the mobile communication terminal stops the display for announcing the call reception and rejects a connection for the received call.

A process for checking a message received by a mobile communication terminal in a closed status according to the present invention is explained in detail with reference to FIG. 9 as follows.

FIG. 9 is a diagram to explain a process for checking a message received by a mobile communication terminal in a closed status according to the present invention.

Referring to FIG. 9, in case of receiving a message, the mobile communication terminal displays a phrase for announcing that the message is received on an image 912 as soon as displays 'confirm' 914 and 'reserve' 916 on a lower end of the image 912 (910).

If the 'confirm' 914 is selected, the mobile communication terminal outputs contents 922 of the received message and associated information (e.g., originator information 924) to the image (920).

If the upper slider is open against the lower slider in the status 920, the mobile communication terminal keeps outputting the message contents and associated information (930).

If the 'reserve' 916 is selected, the mobile communication terminal displays a phrase for announcing a message reception on an image 942 as soon as displays 'end' 944 on a lower end of the image 942 (940). In this case, if the 'end' 944 is selected, the mobile communication terminal stops the display for announcing the message reception and outputs a standby image.

A process for transmitting a call by a mobile communication terminal in a closed status according to the present invention is explained in detail with reference to FIG. 10 as follows.

FIG. 10 is a diagram to explain a process for transmitting a call by a mobile communication terminal in a closed status according to the present invention.

Referring to FIG. 10, while a standby image 1012 is maintained, the mobile communication terminal displays 'function' 1014 on a lower end of the standby image 1012 (1010). In this case, the function means a function of transmitting a call while a terminal is in a closed status.

If the 'function' 1014 is selected, the mobile communication terminal displays a most recently called phone number on an image 1022 as soon as displays 'send' 1024 on a lower end of the image 1022 (1020).

If the 'send' 1024 is selected, the mobile communication terminal transmits a call to a terminal corresponding to the most recently called phone number. N this case, the mobile communication terminal displays a call time according to the call transmission or call connection on an image 1032 as soon as displays 'end' 1034 on a lower end of the image 1032 (1030).

If the 'function' 1014 is selected, the mobile communication terminal displays a phone number list including a plurality of phone numbers on an image 1042 as soon as displays 'send' 1044 on a lower end of the image 1042 (1040). In this case, the phone number list can be a speed dial list including speed dials assigned to the respective phone numbers. If 'speed dial 2' 1046 is selected from a plurality of the speed dials, the mobile communication terminal displays a phone number set to the 'speed dial 2' 1046 and a user name on a prescribed area of the image 1042 (1040).

If the 'send' 1044 is selected, the mobile communication terminal transmits a call to the phone number set to the 'speed dial 2' 1046. In this case, the mobile communication terminal displays a call time according to the call transmission or connection as soon as displays 'en' 1034 on a lower end of the image 1032 (1030).

A process for transmitting a message by a mobile communication terminal in a closed status according to the present invention is explained in detail with reference to FIG. 11 as follows.

FIG. 11 is a diagram to explain a process for transmitting a message by a mobile communication terminal in a closed status according to the present invention.

Referring to FIG. 11, while a standby image 1112 is maintained, the mobile communication terminal displays 'function' 1114 on a lower end of the standby image 1112 (1110). In this case, the function means a function of transmitting a message while a terminal is in a closed status.

If the 'function' 1114 is selected, the mobile communication terminal displays a most recently called phone number on an image 1122 as soon as displays 'message' 1124 on a lower end of the image 1122 (1120).

If the 'message' 1124 is selected, the mobile communication terminal displays a write image of the message to be transmitted to the most recently called phone number (1130). The write image of the message includes a message content window 1132, a receiving terminal number window 1134, and the like. If 'transmit' 1136 displayed on a lower end of the write image of the message is selected, the mobile communication terminal transmits the written message to the most recently called phone number.

If the 'function' 1114 is selected, the mobile communication terminal displays a phone number list including a plurality of phone numbers on an image 1142 as soon as displays 'message' 1144 on a lower end of the image 1142 (1140).

If the 'message' 1144 is selected, the mobile communication terminal displays a write image of a message to be transmitted to one selected from a plurality of the phone numbers (1130).

Figure 12:
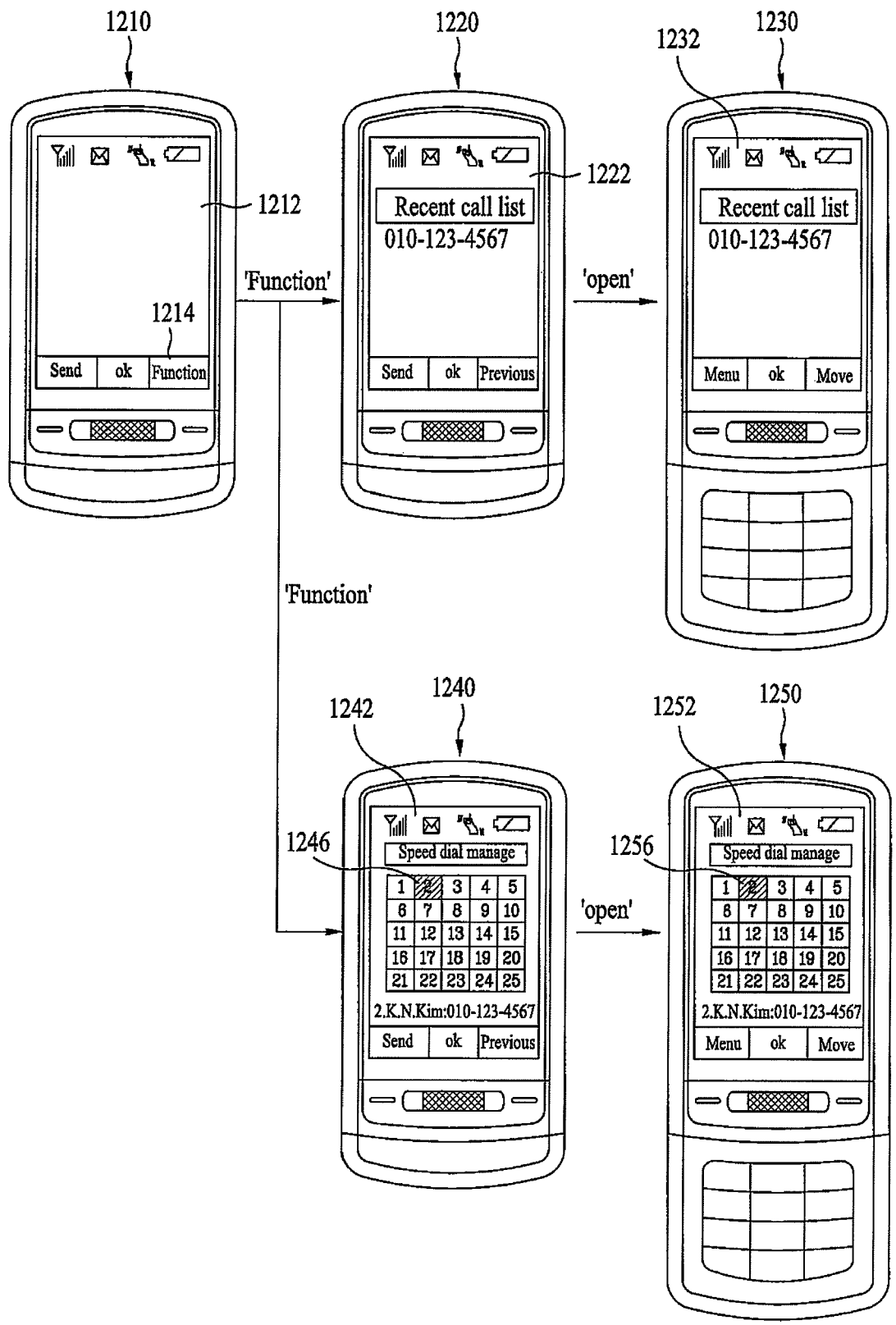
FIG. 12 is a diagram of images when a mobile communication terminal according to the present invention enters an open status from a closed status.

FIG. 12 is a diagram of images when a mobile communication terminal according to the present invention enters an open status from a closed status.

Referring to FIG. 12, while a standby image 121 is maintained, the mobile communication terminal displays 'function' 1214 on a lower end of the standby image 121 (1210).

If the 'function' 1214 is selected, the mobile communication terminal displays a most recently called phone number on an image 1222 and 'send' on a lower end of the image 1222 (1220).

If the mobile communication terminal is opened in the status 1220, the mobile communication terminal maintains to display the information displayed in the status 1220 on an image 1232 and also displays a normal key area on a lower end of the image 1232 (1230). So, the 'send' displayed in the status 1220 is not displayed any more.

If the 'function' 1214 is selected, the mobile communication terminal displays a phone number list including a plurality of phone numbers on an image 1242 as son as displays 'send' on a lower end of the image 1242 (1240). If 'speed dial 2' 1246 is selected from a plurality of speed dials respectively set to a plurality of the phone numbers, the mobile communication terminal displays the phone number set to the 'speed dial 2' 1246 and a user name on a prescribed area of the image 1242 (1240).

If the mobile communication terminal is opened in the status 1240, the mobile communication terminal maintains to display the information displayed in the status 1240 on an image 1252 and also displays a normal key area on a lower end of the image 1252 (1250). So, the 'send' displayed in the status 1240 is not displayed any more.

Figure 13:
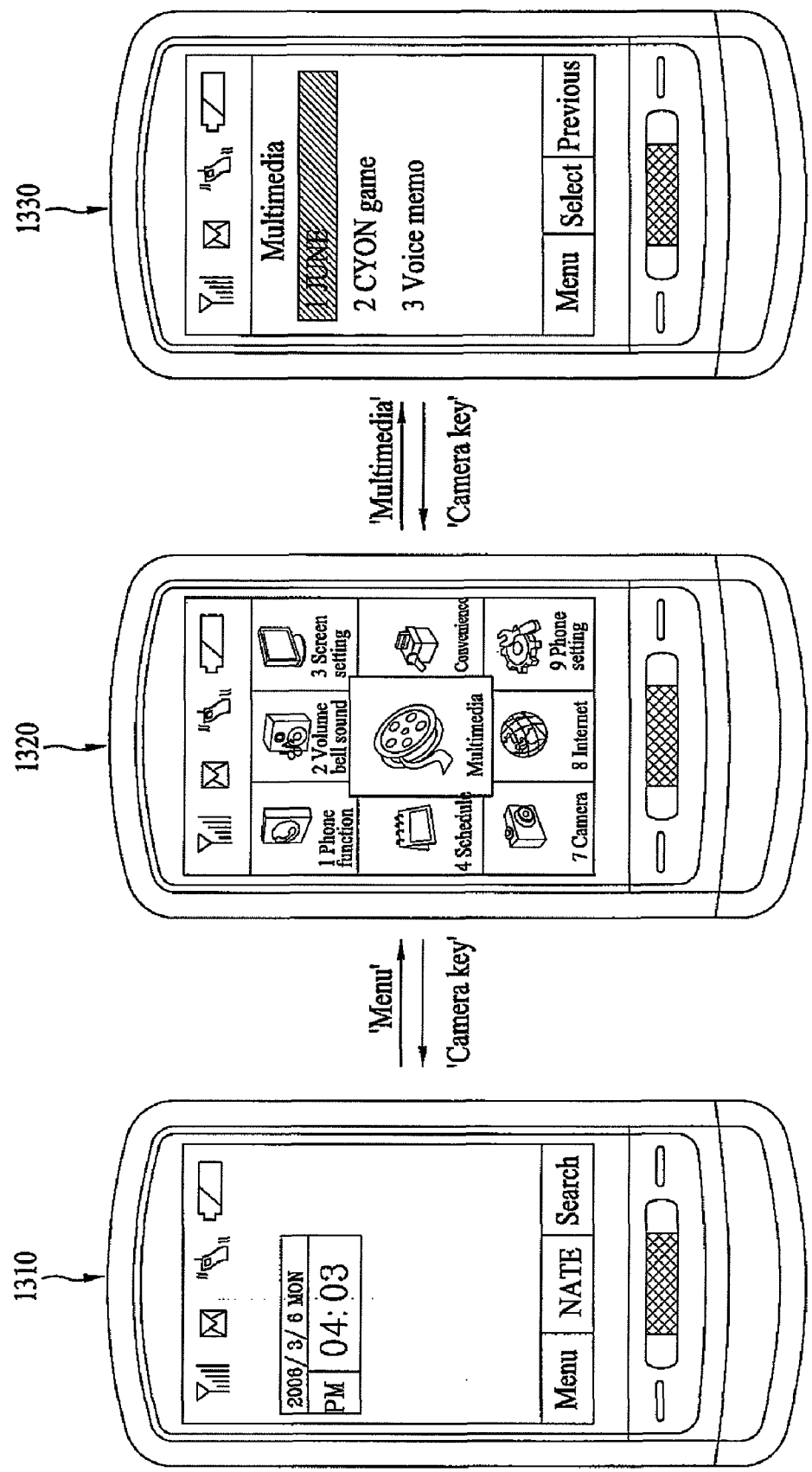
FIG. 13 is a diagram of images of menu selection and return of a mobile communication terminal according to the present invention.

FIG. 13 is a diagram of images of menu selection and return of a mobile communication terminal according to the present invention.

Referring to FIG. 13, while a standby image is maintained, the mobile communication terminal displays 'menu' on a lower end of the standby image (1310). If the displayed 'menu' is selected, the mobile communication terminal displays a plurality of menu items configuring a menu (1320).

In this case, if a 'camera' key provided to an outside of the mobile communication terminal is selected, the mobile communication terminal is able to return to the status 1310. This is because the 'camera' key of the present invention is configured to perform a function of a 'delete/previous' key in a normal terminal configuration.

If 'multimedia' is selected from a plurality of the displayed menu items, the mobile communication terminal displays submenu items corresponding to the multimedia (1330).

In this case, if the 'camera' key is selected, the mobile communication terminal is able to return to the status 1320.

Accordingly, the present invention provides the following effects or advantages.

First of all, a received call can be connected even if the mobile communication terminal is in a closed status. And, the call can be transmitted to an external terminal despite that the mobile communication terminal is in a closed status.

Secondly, a received message can be checked or a message can be transmitted to an external terminal despite that the mobile communication terminal is in a closed status.

Thirdly, a user can be provided with or select a user specific information despite that the mobile communication terminal is in a closed status.

Fourthly, an antenna module and a microphone are efficiently arranged to prevent performance degradation of the microphone and antenna module. And, a terminal can have a slim size.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal, comprising:
 a wireless communication unit configured to receive a call;
 a touch screen display configured to display indication information that the call is being received and to display a first soft touch item and a second soft touch item on the touch screen display when the call is being received; and
 a control unit configured to connect the call being received if the first soft touch item is selected, and to control the touch screen display to continue to display the indication information indicating that the call is being received if the second soft touch item is selected.

2. The mobile communication terminal of claim 1, wherein the control unit is further configured to control the touch screen display to display a scroll key for scrolling a plurality of data displayed on the touch screen display.

3. The mobile communication terminal of claim 1, wherein if either the first soft touch item or the second soft touch item is selected, the control unit is further configured to control the touch screen display to display an 'end' item.

4. The mobile communication terminal of claim 1, further comprising:
an antenna module provided within a lower end portion of the mobile communication terminal; and
a microphone provided within the lower end portion.

5. The mobile communication terminal of claim 4, wherein the antenna module comprises:
a non-conductive carrier having a microphone accommodating part having a prescribed depth to accommodate the microphone therein; and
a conductive radiator fixed onto the non-conductive carrier to transceive radio waves.

6. The mobile communication terminal of claim 5, wherein the microphone inclines toward one side of the lower end portion to be spaced apart from the conductive radiator with a prescribed distance therebetween.

7. The mobile communication terminal of claim 5, wherein the non-conductive carrier has at least one wall partitioning the microphone and the conductive radiator from each other.

8. The mobile communication terminal of claim 5, wherein a height of the microphone accommodating part is configured equal to or smaller than that of the microphone to press the microphone in assembling the non-conductive carrier, wherein a bottom side of the microphone is fixed by a substrate, and
wherein a cushion member is provided to a bottom side of the substrate to pressurize the microphone elastically in assembling the non-conductive carrier.

9. The mobile communication terminal of claim 4, wherein a lower end of the mobile communication terminal includes an exposed part always exposed, and
wherein the antenna module and the microphone are provided within the exposed part.

10. The mobile communication terminal of claim 1, wherein the first soft touch item is a 'send' soft touch key.

11. The mobile terminal of claim 1, wherein the control unit is further configured to control the touch screen display to display additional indication information about the call being received if the second soft touch item is selected.

12. The mobile terminal of claim 1, wherein when the second soft touch item is selected, the controller is further configured to display the indication information without any sound or vibration regardless of whether the mobile terminal is set to a sound or vibration output mode.

13. A method of connecting a call in a mobile communication terminal, the method comprising:
receiving a call;
displaying, on a touch screen display of the mobile communication terminal, information indicating that the call is being received and displaying a first soft touch item and a second soft touch item on the touch screen display;
selecting either the first or second soft touch item;
connecting the call being received if the first soft touch item is selected while the mobile communication terminal is in the closed status; and
continuing to display the indication information indicating that the call is being received if the second soft touch item is selected.

14. The method of claim 13, further comprising:
if either the first or second soft touch item is selected, displaying on the touch screen display an 'end' item.

15. The method claim 13, wherein the first soft touch item is a 'send' key.

16. The method of claim 13, further comprising:
displaying on the touch screen display additional indication information about the call being received if the second soft touch item is selected.

17. The method of claim 13, wherein when the second soft touch item is selected, the method further comprises displaying the indication information without any sound or vibration regardless of whether the mobile terminal is set to a sound or vibration output mode.

18. A mobile communication terminal comprising:
a wireless communication unit configured to receive a call;
a display unit configured to display an indication information that the call is being received and to display a first item and a second item when the call is being received; and
an input unit having a key for selecting either the first item or the second item; and
a control unit configured to control the display unit to continue to display the indication information indicating that the call is being received if the second item is selected.

19. The mobile communication terminal of claim 18, wherein the control unit is further configured to control the display unit to change the second item to a third item if the second item is selected.

20. The mobile communication terminal of claim 19, wherein the control unit is further configured to reject a connection for the call being received if the third item is selected.

21. The mobile communication terminal of claim 19, wherein the control unit is further configured to control the display unit to stop displaying the indication information if the third item is selected.

22. The mobile communication terminal of claim 18, wherein when the second item is selected, the control unit is further configured to continue to display the indication information without any sound or vibration regardless of whether the mobile terminal is set to a sound or vibration output mode.

* * * * *